(12) United States Patent
Zhang

(10) Patent No.: US 11,775,048 B1
(45) Date of Patent: Oct. 3, 2023

(54) SAFETY CONTROL METHOD AND SYSTEM FOR AI SERVER

(71) Applicant: INSPUR ELECTRONIC INFORMATION INDUSTRY CO., LTD., Shandong (CN)

(72) Inventor: Guolei Zhang, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 18/043,422

(22) PCT Filed: Jan. 26, 2022

(86) PCT No.: PCT/CN2022/074068
§ 371 (c)(1),
(2) Date: Feb. 28, 2023

(87) PCT Pub. No.: WO2022/174732
PCT Pub. Date: Aug. 25, 2022

(30) Foreign Application Priority Data

Feb. 19, 2021 (CN) .......................... 202110189447.8

(51) Int. Cl.
*G06F 1/26* (2006.01)
*G06F 1/32* (2019.01)
(Continued)

(52) U.S. Cl.
CPC ............ *G06F 1/3296* (2013.01); *G06F 1/206* (2013.01)

(58) Field of Classification Search
CPC ............................... G06F 1/206; G06F 1/3296
See application file for complete search history.

(56) References Cited

U.S. PATENT DOCUMENTS

2012/0151233 A1   6/2012 Chao
2014/0380073 A1*  12/2014 Yu ........................... G06F 1/324
                                                     713/322
(Continued)

FOREIGN PATENT DOCUMENTS

CN        108304295 A     7/2018
CN        109611367 A     4/2019
(Continued)

OTHER PUBLICATIONS

Search report for international application No. PCT/CN2022/074068 dated Apr. 7, 2022.
(Continued)

*Primary Examiner* — Nitin C Patel
(74) *Attorney, Agent, or Firm* — Dennemeyer & Associates LLC; Victoria Friedman

(57) ABSTRACT

Provided is a safety control method for an AI server, which is applied in an FPGA. The method includes: obtaining a current electrical current and a current power of a GPU in the AI server according to a preset frequency; determining whether the GPU satisfies a first control privilege transfer requirement; when the GPU satisfies the first control privilege transfer requirement, taking over control privilege of a heat dissipation system from a BMC; and controlling the heat dissipation system according to the current electrical current and the current power of the GPU; wherein the first control privilege transfer requirement includes: the current electrical current of the GPU exceeds a preset electrical current, or a rate of change of the current electrical current of the GPU exceeds a preset rate of change of electrical current, or the current power of the GPU exceeds a first preset power.

20 Claims, 2 Drawing Sheets

(51) Int. Cl.
      *G06F 1/3296*    (2019.01)
      *G06F 1/20*      (2006.01)

(56) References Cited

U.S. PATENT DOCUMENTS

| | | |
|---|---|---|
| 2019/0235596 A1 | 8/2019 | Lugo Beauchamp et al. |
| 2020/0323102 A1 | 10/2020 | Artman et al. |
| 2023/0035371 A1* | 2/2023 | Wang .................. G06T 1/20 |

FOREIGN PATENT DOCUMENTS

| | | |
|---|---|---|
| CN | 210129217 U | 3/2020 |
| CN | 111290560 A | 6/2020 |
| CN | 111414069 A | 7/2020 |
| CN | 111475009 A | 7/2020 |
| CN | 112947720 A | 6/2021 |

OTHER PUBLICATIONS

Office action for Chinese application No. 202110189447.8 filed on Feb. 19, 2021.

* cited by examiner

… (1)

SAFETY CONTROL METHOD AND SYSTEM FOR AI SERVER

CROSS-REFERENCE TO RELATED APPLICATIONS

This is a 35 U.S.C. 371 National Stage Patent Application of International Application No. PCT/CN2022/074068, filed Jan. 26, 2022, which claims priority to Chinese application 202110189447.8, filed Feb. 19, 2021, each of which is hereby incorporated by reference in its entirety.

TECHNICAL FIELD

The present disclosure relates to the field of server control, and in particular to a safety control method and system for an Artificial Intelligence (AI) server.

BACKGROUND

At present, heat dissipation of traditional servers is generally controlled by a Baseboard Management Controller (BMC), and the BMC periodically scans mainboard information of the server and dynamically adjusts a fan according to the mainboard information. However, power consumption of a Graphics Processing Unit (GPU) configured in an AI server changes very fast with the upgrade of the server type, and the BMC is limited by a sampling frequency and cannot respond to the power consumption of the GPU in a timely manner, thereby generating a hidden danger that the mainboard is burned out due to untimely heat dissipation.

Therefore, how to provide a solution to the above technical problems is a problem that needs to be solved by those having ordinary skill in the art at present.

SUMMARY

In view of this, embodiments of the present disclosure provide a reliable safety control method and system for an AI server. The specific solutions are described as follows.

A safety control method for an AI server, which is applied in a Field Programmable Gate Array (FPGA), includes the following operations.

A current electrical current and a current power of a GPU in the AI server are obtained according to a preset frequency.

When the GPU satisfies a first control privilege transfer requirement, control privilege of a heat dissipation system is taken over from a BMC.

The heat dissipation system is controlled according to the current electrical current and the current power of the GPU.

The first control privilege transfer requirement includes: the current electrical current of the GPU exceeds a preset electrical current, or a rate of change of the current electrical current of the GPU exceeds a preset rate of change of electrical current, or the current power of the GPU exceeds a first preset power.

In an embodiment, the safety control method may further include the following operation.

According to the current electrical current and the current power of the GPU, the GPU is controlled to lower a frequency to make the current electrical current of GPU lower than the preset electrical current.

In an embodiment, the process of controlling the heat dissipation system according to the current electrical current and the current power of the GPU includes the following operation.

According to the current electrical current and the current power of the GPU, the heat dissipation system is controlled to dissipate heat at full speed.

In an embodiment, after obtaining the current electrical current and the current power of the GPU in the AI server according to the preset frequency, the safety control method may further include the following operation.

A current power of a power supply module is obtained according to the preset frequency.

Accordingly, the first control privilege transfer requirement includes: the current electrical current of the GPU exceeds the preset electrical current, or the rate of change of the current electrical current of the GPU exceeds the preset rate of change of electrical current, or the current power of the GPU exceeds the first preset power, or a rate of change of the current power of the power supply module exceeds a preset rate of change of power, or the current power of the power supply module exceeds a second preset power.

In an embodiment, the safety control method may further include the following operation.

When the GPU satisfies a second control privilege transfer requirement, the control privilege of the heat dissipation system is returned to the BMC.

The second control privilege transfer requirement includes: the current electrical current of the GPU does not exceed the preset electrical current, the rate of change of the current electrical current of the GPU does not exceed the preset rate of change of electrical current, and the current power of the GPU does not exceed the first preset power.

In an embodiment, the preset frequency is a sampling frequency at a millisecond level.

Accordingly, the embodiments of the present disclosure also provide a safety control system for an AI server, wherein the safety control system includes an FPGA and a BMC. The FPGA includes a first sampling module, a determination module and a first control module.

The first sampling module is configured to obtain a current electrical current and a current power of a GPU in the AI server according to a preset frequency.

The determination module is configured to take over, when the GPU satisfies a first control privilege transfer requirement, control privilege of a heat dissipation system from a BMC.

The first control module is configured to control the heat dissipation system according to the current electrical current and the current power of the GPU.

The first control privilege transfer requirement includes: the current electrical current of the GPU exceeds a preset electrical current, or a rate of change of the current electrical current of the GPU exceeds a preset rate of change of electrical current, or the current power of the GPU exceeds a first preset power.

In an embodiment, the safety control system may further include a second control module.

The second control module is configured to control, according to the current electrical current and the current power of the GPU, the GPU to lower a frequency to make the current electrical current of GPU lower than the preset electrical current.

In an embodiment, the first sampling module is further configured to obtain a current power of a power supply module according to the preset frequency.

Accordingly, the first control privilege transfer requirement includes: the current electrical current of the GPU exceeds the preset electrical current, or the rate of change of the current electrical current of the GPU exceeds the preset rate of change of electrical current, or the current power of the GPU exceeds the first preset power, or a rate of change of the current power of the power supply module exceeds a preset rate of change of power, or the current power of the power supply module exceeds a second preset power.

In an embodiment, the determination module is further configured to return, when the GPU satisfies a second control privilege transfer requirement, the control privilege of the heat dissipation system to the BMC.

The second control privilege transfer requirement includes:

the current electrical current of the GPU does not exceed the preset electrical current, the rate of change of the current electrical current of the GPU does not exceed the preset rate of change of electrical current, and the current power of the GPU does not exceed the first preset power.

In some embodiments, the embodiments of the present disclosure also provide a computer device, including a memory and one or more processors. Computer-readable instructions are stored in the memory, and the computer-readable instructions, when executed by the processor, enable the one or more processors to perform the operations of any one of the above safety control methods for the AI server.

In some embodiments, the embodiments of the present disclosure also provide one or more non-transitory storage media storing computer-readable instructions. The computer-readable instructions, when executed by one or more processors, enable the one or more processors to perform the operations of any one of the above safety control methods for the AI server.

The details of one or more embodiments of the present disclosure are proposed in the following drawings and descriptions. Other features and advantages of the present disclosure become apparent from the specification, drawings, and claims.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those having ordinary skill in the art according to these drawings without creative efforts.

DETAILED DESCRIPTION

The technical solutions in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those having ordinary skill in the art on the basis of the embodiments in the present disclosure without creative work shall fall within the scope of protection of the present disclosure.

The power consumption of a GPU configured in an AI server changes very fast with the upgrade of the server type, and a BMC is limited by a sampling frequency and cannot respond to the power consumption of the GPU in a timely manner, thereby generating a hidden danger that the mainboard is burned out due to untimely heat dissipation. In the embodiments of the present disclosure, an FPGA that is independent of the BMC is chosen for performing state sampling on the GPU, so that a higher preset frequency can be used to respond to a change of the GPU in a timely manner, and when the GPU satisfies a first control privilege transfer requirement, the FPGA controls a heat dissipation system, which may ensure quick action from the heat dissipation system and guarantee safe and stable operation of the AI server.

Figure 1:
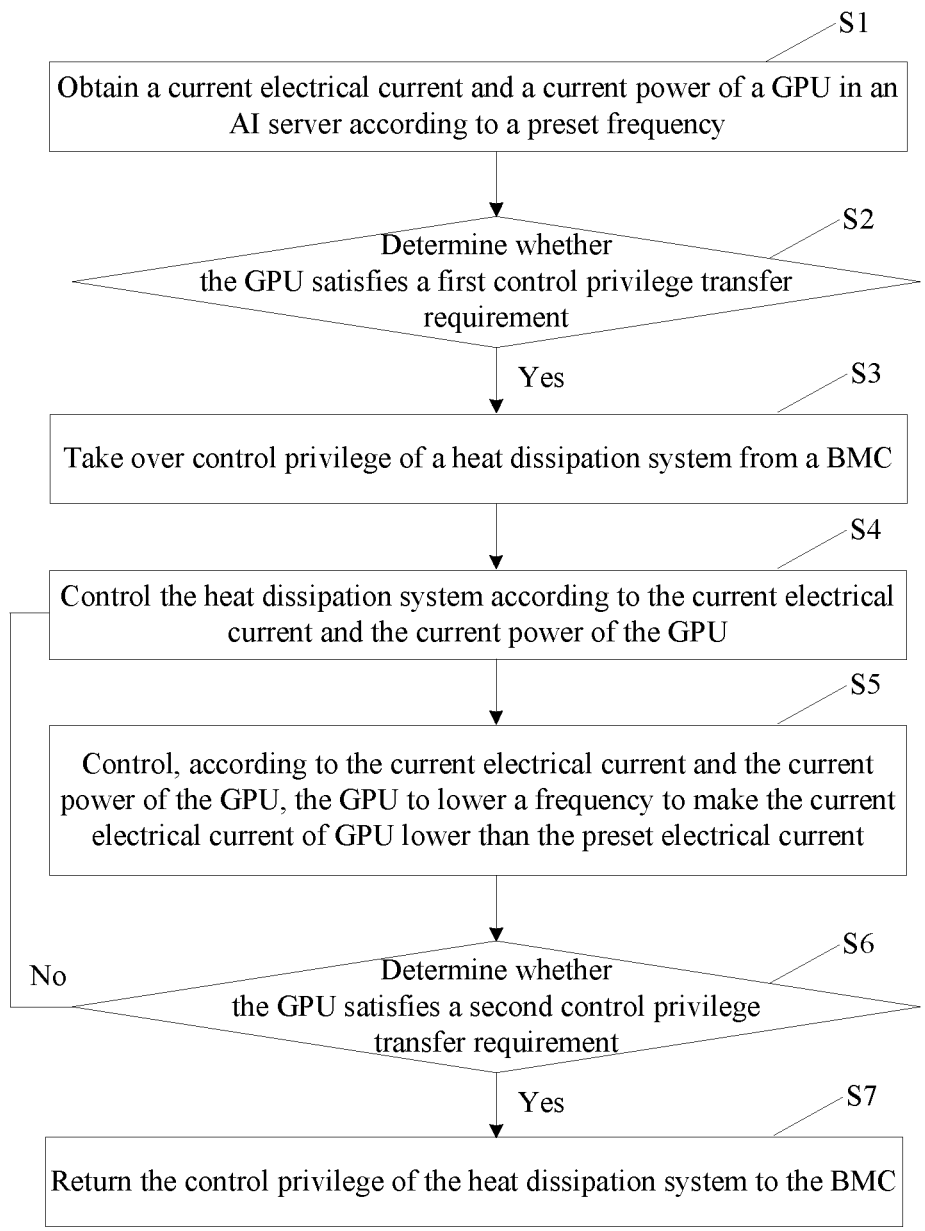
FIG. 1 is a flowchart of operations of a safety control method for an AI server according to one or more embodiments of the present disclosure.

The embodiments of the present disclosure provide a safety control method for an AI server, which is applied to an FPGA. As shown in FIG. 1, the safety control method includes the following operations.

At S1, a current electrical current and a current power of a GPU in the AI server are obtained according to a preset frequency.

It is understandable that, the traditional three major components, i.e., Central Processing Unit (CPU), memory and hard disk, in the AI server have little fluctuation in power consumption, and the BMC acquires relevant state information according to a timing frequency at a second level to ensure the safe operation of the server. However, because the GPU is hardware that has high energy consumption and fast changes in energy consumption in the AI server, the server cannot be effectively monitored by a sampling frequency at a second level. If the sampling frequency is increased, too much resource consumption of the BMC may be caused, which may affect the use of other functions of the BMC. In the embodiments, a state of an element in the AI server is obtained by using the FPGA, the current electrical current and the current power of the GPU are mainly obtained. Of course, there may also be states of other elements and parameters in other forms that could be acquired by using the FPGA. When state information is acquired by using the FPGA, since the acquisition performed by the FPGA does not need to occupy resources of the BMC, the preset frequency of the FPGA may be independently chosen. In order to ensure the reliability of state data of the GPU, the preset frequency for sampling is usually set to be a millisecond level or even a microsecond level. Furthermore, the preset frequency may be correspondingly and dynamically set among a set of high and low values according to the fluctuation speed of different sampling targets.

At S2, whether the GPU satisfies a first control privilege transfer requirement is determined.

The first control privilege transfer requirement includes: the current electrical current of the GPU exceeds a preset electrical current, or a rate of change of the current electrical current of the GPU exceeds a preset rate of change of electrical current, or the current power of the GPU exceeds a first preset power.

It is understandable that the first control privilege transfer requirement here is mainly based on the change of the GPU. In some exemplary implementations, in addition to the change in the state of the GPU, other determination parameters may also be added, for example, the change in the overall power supply of the AI server. That is, after the current electrical current and the current power of the GPU in the AI server are obtained according to the preset frequency in S1, the safety control method may further include: a current power of a power supply module is obtained according to the preset frequency. Accordingly, the first control privilege transfer requirement includes: the current electrical current of the GPU exceeds the preset electrical current, or the rate of change of the current electrical current of the GPU exceeds the preset rate of change of electrical current, or the current power of the GPU exceeds the first preset power, or a rate of change of the current power of the power supply module exceeds a preset rate of change of power, or the current power of the power supply module exceeds a second preset power.

If the GPU does not satisfy the first control privilege transfer requirement, the BMC continues controlling the heat dissipation system.

At S3, when the GPU satisfies the first control privilege transfer requirement, the control privilege of the heat dissipation system is obtained from the BMC.

In some exemplary embodiments, the FPGA determines whether the GPU satisfies the first control privilege transfer requirement, and when the FPGA determines that the GPU satisfies the first control privilege transfer requirement, the FPGA takes over the control privilege of the heat dissipation system from the BMC based on a determination result.

At S4, the heat dissipation system is controlled according to the current electrical current and the current power of the GPU.

In some exemplary embodiments, according to the current electrical current and the current power of the GPU, the heat dissipation system is controlled to dissipate heat at full speed. The control of the heat dissipation system mainly includes the control of a fan.

Further, the safety control method may further include the following operation.

At S5, according to the current electrical current and the current power of the GPU, the GPU is controlled to lower a frequency to make the current electrical current of GPU lower than the preset electrical current.

It is understandable that if the GPU satisfies the first control privilege requirement, it indicates that the current state is severe, more powerful heat dissipation measures and frequency reduction measures need to be taken, and these measures cannot be completed by the BMC itself without increasing resources, so that actions of S4 and S5 are independently implemented by the FPGA.

Further, the safety control method may further include the following operations.

At S6, whether the GPU satisfies a second control privilege transfer requirement is determined.

The second control privilege transfer requirement includes: the current electrical current of the GPU does not exceed the preset electrical current, the rate of change of the current electrical current of the GPU does not exceed the preset rate of change of electrical current, and the current power of the GPU does not exceed the first preset power.

At S7, when the GPU satisfies the first control privilege transfer requirement, the control privilege of the heat dissipation system is returned to the BMC.

In some exemplary embodiments, the FPGA determines whether the GPU satisfies the second control privilege transfer requirement, and returns the control privilege of the heat dissipation system to the BMC in response to determining that the GPU satisfies the second control privilege transfer requirement.

If not, the flow returns back to S4.

In the safety control method for the AI server provided in the embodiments of the present disclosure, which is applied in the FPGA, the safety control method includes: the current electrical current and the current power of the GPU in the AI server are obtained according to the preset frequency; whether the GPU satisfies the first control privilege transfer requirement is determined; when the GPU satisfies the first control privilege transfer requirement, the control privilege of the heat dissipation system is obtained from the BMC; and the heat dissipation system is controlled according to the current electrical current and the current power of the GPU. The first control privilege transfer requirement includes: the current electrical current of the GPU exceeds the preset electrical current, or the rate of change of the current electrical current of the GPU exceeds the preset rate of change of electrical current, or the current power of the GPU exceeds the first preset power. In the embodiments of the present disclosure, an FPGA that is independent of the BMC is chosen for performing state sampling on the GPU, so that the higher preset frequency can be used to respond to a change of the GPU in a timely manner, and when the GPU satisfies the first control privilege transfer requirement, the FPGA controls the heat dissipation system, which may ensure quick action from the heat dissipation system and guarantee safe and stable operation of the AI server.

Figure 2:
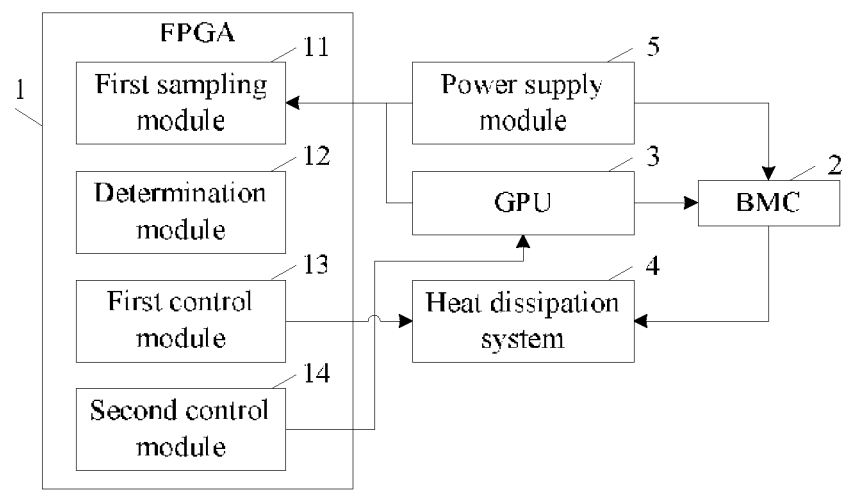
FIG. 2 is a structure distribution diagram of a safety control system for an AI server according to one or more embodiments of the present disclosure.

Accordingly, the embodiments of the present disclosure also provide a safety control system for an AI server. As shown in FIG. 2, the safety control system includes an FPGA 1 and a BMC 2. The FPGA 1 includes a first sampling module 11, a determination module 12 and a first control module 13.

The first sampling module 11 is configured to obtain a current electrical current and a current power of the GPU 3 in the AI server according to a preset frequency.

The determination module 12 is configured to take over, when the GPU 3 satisfies a first control privilege transfer requirement, control privilege of a heat dissipation system 4 from the BMC 2.

The first control module 13 is configured to control the heat dissipation system 4 according to the current electrical current and the current power of the GPU 3.

The first control privilege transfer requirement includes: the current electrical current of the GPU 3 exceeds a preset electrical current, or the rate of change of the current electrical current of the GPU 3 exceeds a preset rate of change of electrical current, or the current power of the GPU 3 exceeds a first preset power.

In some exemplary embodiments, the safety control system may further include a second control module 14.

The second control module 14 is configured to control, according to the current electrical current and the current power of the GPU 3, the GPU 3 to lower a frequency to make the current electrical current of GPU 3 lower than the preset electrical current.

In some exemplary embodiments, the first sampling module 11 is further configured to obtain a current power of a power supply module 5 according to the preset frequency.

Accordingly, the first control privilege transfer requirement includes: the current electrical current of the GPU 3 exceeds the preset electrical current, or the rate of change of the current electrical current of the GPU 3 exceeds the preset rate of change of electrical current, or the current power of the GPU 3 exceeds a first preset power, or a rate of change of the current power of the power supply module 5 exceeds a preset rate of change of power, or the current power of the power supply module 5 exceeds a second preset power.

In some exemplary embodiments, the determination module 12 is further configured to return, when the GPU 3 satisfies a second control privilege transfer requirement, the control privilege of the heat dissipation system 4 to the BMC 2.

The second control privilege transfer requirement includes:

the current electrical current of the GPU 3 does not exceed the preset electrical current, the rate of change of the current electrical current of the GPU 3 does not exceed the preset rate of change of electrical current, and the current power of the GPU 3 does not exceed the first preset power.

In the embodiments of the present disclosure, an FPGA that is independent of the BMC is chosen for performing state sampling on the GPU, so that the higher preset frequency can be used to respond to a change of the GPU in a timely manner, and when the GPU satisfies the first control privilege transfer requirement, the FPGA controls the heat dissipation system, which may ensure quick action from the heat dissipation system and guarantee safe and stable operation of the AI server.

Figure 3:
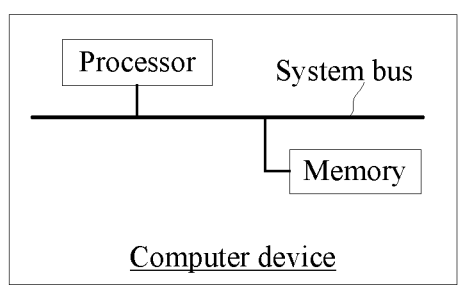
FIG. 3 is a schematic structural diagram of a computer device according to one or more embodiments of the present disclosure.

Another aspect of the embodiments of the present disclosure provides a computer device, as shown in FIG. 3, including a memory and one or more processors. Computer-readable instructions are stored in the memory, and the computer-readable instructions, when executed by the processor, enable the one or more processors to perform the above safety control method for the AI server.

The embodiments of the present disclosure also provide one or more non-transitory storage media storing computer-readable instructions. The computer-readable instructions, when executed by one or more processors, enable the one or more processors to perform the above safety control method for the AI server.

Those having ordinary skill in the art may understand that the structure shown in FIG. 3 is only a block diagram of a partial structure related to the solution of the embodiments of the present disclosure, and does not constitute a limitation on the equipment to which the solution of the embodiments of the present disclosure is applied. More or fewer components than those shown in the figures may be included in the device, or some components shown in the figures may be combined, or the components shown in the figures may have different arrangements.

Those having ordinary skill in the art may know that all or part of the processes in the safety control methods of the above embodiments may be implemented by instructing the relevant hardware through computer-readable instructions. The computer-readable instructions may be stored in a non-transitory computer-readable storage medium, the computer-readable instructions, when executed, may include the processes of the above method embodiments. Any reference to a memory, storage, database or other medium used in the various embodiments provided in the present disclosure may include a non-volatile and/or volatile memory. The nonvolatile memory may include a Read Only Memory (ROM), a Programmable ROM (PROM), an Erasable PROM (EPROM), an Electrically EEPROM (EEPROM), or a flash memory. The volatile memory may include a Random Access Memory (RAM) or an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchronous link DRAM (SLDRAM), a Direct Rambus RAM (RDRAM), a Direct Rambus DRAM (DRDRAM), a Rambus DRAM (RDRAM), etc.

The technical features of the above-described embodiments may be arbitrarily combined. For the sake of brevity of description, not all possible combinations of the technical features in the above embodiments are described. However, as long as there is no contradiction between the combinations of these technical features, all should be considered to fall within the scope of this description.

The above embodiments are merely illustrative of several implementations of the present disclosure with specific and detailed description, and are not to be construed as limiting the patent scope of the present disclosure. It is to be noted that a number of variations and modifications may be made by those having ordinary skill in the art without departing from the conception of the present disclosure, and all fall within the scope of protection of the present disclosure. Therefore, the scope of protection of the present disclosure should be determined by the appended claims.

What is claimed is:

1. A safety control method for an Artificial Intelligence (AI) server, which is applied in a Field Programmable Gate Array (FPGA), the safety control method comprising:
   obtaining a current electrical current and a current power of a Graphics Processing Unit (GPU) in the AI server according to a preset frequency;
   when the GPU satisfies a first control privilege transfer requirement, taking over control privilege of a heat dissipation system from a Baseboard Management Controller (BMC); and
   controlling the heat dissipation system according to the current electrical current and the current power of the GPU;
   wherein the first control privilege transfer requirement comprises: the current electrical current of the GPU exceeds a preset electrical current, or a rate of change of the current electrical current of the GPU exceeds a preset rate of change of electrical current, or the current power of the GPU exceeds a first preset power.

2. The safety control method according to claim 1, further comprising:
   according to the current electrical current and the current power of the GPU, controlling the GPU to lower a frequency to make the current electrical current of GPU lower than the preset electrical current.

3. The safety control method according to claim 1, wherein controlling the heat dissipation system according to the current electrical current and the current power of the GPU comprises:
   according to the current electrical current and the current power of the GPU, controlling the heat dissipation system to dissipate heat at full speed.

4. The safety control method according to claim 1, wherein after obtaining the current electrical current and the current power of the GPU in the AI server according to the preset frequency, the safety control method further comprises:
   obtaining a current power of a power supply module according to the preset frequency; and
   accordingly, the first control privilege transfer requirement comprises: the current electrical current of the GPU exceeds the preset electrical current, or the rate of change of the current electrical current of the GPU exceeds the preset rate of change of electrical current, or the current power of the GPU exceeds the first preset power, or a rate of change of the current power of the power supply module exceeds a preset rate of change of power, or the current power of the power supply module exceeds a second preset power.

5. The safety control method according to claim 1, further comprising:
when the GPU satisfies a second control privilege transfer requirement, returning the control privilege of the heat dissipation system to the BMC;
wherein the second control privilege transfer requirement comprises: the current electrical current of the GPU does not exceed the preset electrical current, the rate of change of the current electrical current of the GPU does not exceed the preset rate of change of electrical current, and the current power of the GPU does not exceed the first preset power.

6. The safety control method according to claim 5, wherein the preset frequency is a sampling frequency at a millisecond level.

7. The safety control method according to claim 5, wherein the preset frequency is a sampling frequency at a microsecond level.

8. The safety control method according to claim 1, wherein the preset frequency is correspondingly and dynamically set among a set of values according to a fluctuation speed of different sampling targets.

9. A safety control system for an Artificial Intelligence (AI) server, the safety control system comprising a Field Programmable Gate Array (FPGA) and a Baseboard Management Controller (BMC), the FPGA being configured to:
obtain a current electrical current and a current power of a Graphics Processing Unit (GPU) in the AI server according to a preset frequency;
take over, when the GPU satisfies a first control privilege transfer requirement, control privilege of a heat dissipation system from the BMC; and
control the heat dissipation system according to the current electrical current and the current power of the GPU;
wherein the first control privilege transfer requirement comprises: the current electrical current of the GPU exceeds a preset electrical current, or a rate of change of the current electrical current of the GPU exceeds a preset rate of change of electrical current, or the current power of the GPU exceeds a first preset power.

10. The safety control system according to claim 9, wherein the FPGA is further configured to:
control, according to the current electrical current and the current power of the GPU, the GPU to lower a frequency to make the current electrical current of GPU lower than the preset electrical current.

11. The safety control system according to claim 9, wherein the FPGA is further configured to obtain a current power of a power supply module according to the preset frequency; and
accordingly, the first control privilege transfer requirement comprises: the current electrical current of the GPU exceeds the preset electrical current, or the rate of change of the current electrical current of the GPU exceeds the preset rate of change of electrical current, or the current power of the GPU exceeds the first preset power, or a rate of change of the current power of the power supply module exceeds a preset rate of change of power, or the current power of the power supply module exceeds a second preset power.

12. The safety control system according to claim 9, wherein the FPGA is further configured to return, when the GPU satisfies a second control privilege transfer requirement, the control privilege of the heat dissipation system to the BMC;
wherein the second control privilege transfer requirement comprises:
the current electrical current of the GPU does not exceed the preset electrical current, the rate of change of the current electrical current of the GPU does not exceed the preset rate of change of electrical current, and the current power of the GPU does not exceed the first preset power.

13. The safety control system according to claim 9, wherein the FPGA is further configured to: control, according to the current electrical current and the current power of the GPU, the heat dissipation system to dissipate heat at full speed.

14. The safety control system according to claim 9, wherein the preset frequency is correspondingly and dynamically set among a set of values according to a fluctuation speed of different sampling targets.

15. The safety control system according to claim 12, wherein the preset frequency is a sampling frequency at a millisecond level.

16. The safety control system according to claim 12, wherein the preset frequency is a sampling frequency at a microsecond level.

17. One or more non-transitory computer-readable storage media storing computer-readable instructions, the computer-readable instructions, when executed by one or more processors, enabling the one or more processors to perform following operations applied in a Field Programmable Gate Array (FPGA):
obtaining a current electrical current and a current power of a Graphics Processing Unit (GPU) in the AI server according to a preset frequency;
when the GPU satisfies a first control privilege transfer requirement, taking over control privilege of a heat dissipation system from a Baseboard Management Controller (BMC); and
controlling the heat dissipation system according to the current electrical current and the current power of the GPU;
wherein the first control privilege transfer requirement comprises: the current electrical current of the GPU exceeds a preset electrical current, or a rate of change of the current electrical current of the GPU exceeds a preset rate of change of electrical current, or the current power of the GPU exceeds a first preset power.

18. The non-transitory computer-readable storage media according to claim 17, wherein the computer-readable instructions, when executed by one or more processors, enable the one or more processors to further perform following operations applied in the FPGA: according to the current electrical current and the current power of the GPU, controlling the GPU to lower a frequency to make the current electrical current of GPU lower than the preset electrical current.

19. The non-transitory computer-readable storage media according to claim 17, wherein the computer-readable instructions, when executed by one or more processors, enable the one or more processors to perform following operations applied in the FPGA: according to the current electrical current and the current power of the GPU, controlling the heat dissipation system to dissipate heat at full speed.

20. The non-transitory computer-readable storage media according to claim 17, wherein the computer-readable instructions, when executed by one or more processors, enable the one or more processors to further perform following operations applied in the FPGA after obtaining the current electrical current and the current power of the GPU in the AI server according to the preset frequency: obtaining a current power of a power supply module according to the preset frequency; and accordingly, the first control privilege transfer requirement comprises: the current electrical current of the GPU exceeds the preset electrical current, or the rate of change of the current electrical current of the GPU exceeds the preset rate of change of electrical current, or the current power of the GPU exceeds the first preset power, or a rate of change of the current power of the power supply module exceeds a preset rate of change of power, or the current power of the power supply module exceeds a second preset power.

* * * * *